UNITED STATES PATENT OFFICE.

RICHARD WOLFFENSTEIN, OF BERLIN, GERMANY.

ACIDYLSALICYLIC ACID ESTER AND PROCESS OF MAKING SAME.

1,063,099. Specification of Letters Patent. Patented May 27, 1913.

No Drawing. Application filed November 25, 1911. Serial No. 662,456.

*To all whom it may concern:*

Be it known that I, RICHARD WOLFFENSTEIN, a citizen of the German Empire, residing at Berlin, in the Kingdom of Prussia, Germany, have invented certain new and useful Improvements in Acidylsalicylic Acid Esters and Processes of Making Same; and I do hereby declare the following to be a full, clear, and exact description of the invention, such as will enable others skilled in the art to which it appertains to make and use the same.

My invention relates to improvements in the process of making acidylsalicylic acid ester, and to the product produced thereby.

The production of acetylsalicylic acid esters by causing alcohols to react on chlorid of acetylsalicylic acid, that is by the known method of producing esters, has been found to be impossible. For example, when trying to produce the ethyl ester a mixture is obtained which in its essential elements consists of salicylic acid, salicylids, salicylic acid ethyl ester, and acetic acid ethyl ester. Therefore the reaction of the production of an ethyl ester from an acid chlorid and alcohol which ordinarily takes place in organic chemistry does not take place in this case. Further experiments have shown the general fact, that acidylized salicylic acid halogenids can not be transformed in this way into esters, and that always mixtures of salicylic acid, salicylic acid esters, salicylids, and acetic esters are produced.

I have discovered, that the hydrochloric acid which is liberated has an injurious effect on the reaction whereby the desired ester can not be obtained, but that the reaction does take place, and the acidyl esters are produced, if care is taken, that the hydrochloric acid formed by the reaction is immediately removed. This may be done for example by means of compounds which are adapted to bind acids, such for example as tertiary bases.

In order that my invention be more clearly understood several examples are described hereafter.

First example: 10 grams of acetyl salicylic acid chlorid are mixed with 8 grams of quinolin while cooling the same, whereupon 4 cubic centimeters of absolute alcohol are added. At the end of the reaction the contents of the still are solidified into a thick pulp of crystals. The pulp is thereupon heated half an hour on the water bath, ligroin is added, and the mixture is first shaken with diluted hydrochloric acid, thereupon with soda solution, and finally with water. The solution which is separated from the water is dried with dried sodium sulfate, the ligroin is distilled off, and finally the acetyl salicylic acid ethyl ester

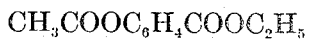

which is thus obtained is distilled off.

The acetyl salicylic acid ethyl ester boils at a temperature of 273 degrees centigrade, reacts neutrally, is readily soluble in alcohol and benzene, difficultly soluble in water, produces when treated with alkali after neutralization the well known violet color with iron chlorid solution, which is characteristic for salicylic acid. As distinguished from the corresponding ester of the salicylic acid its odor is much less strong.

Second example: 10.5 grams of acetyl salicylic acid chlorid (or 10 grams of acetylsalicylic acid and 28 grams of twenty-percentage phosgen dissolved in toluol), 9 grams of trichlorisopropyl alcohol and 18.6 grams of dimethylanilin are dissolved in a little benzene, heated several hours on the water bath, allowed to cool, and shaken with diluted hydrochlorid acid, and thereafter with soda solution and water. The residue which is thus obtained is recrystallized. The acetyl salicylic acid trichlorisopropyl ester

which is thus obtained reacts neutrally with litmus paper. The acetyl group is split off by alkalis, and it can easily be recognized from the violet reaction of the product with iron chlorid. The body is easily soluble in ligroin and in alcohol, very difficulty soluble in water. The ester is decomposed when trying to distil the same, which distillation is not even obtained *in vacuo*. Melting temperature 62 degress centigrade.

Third example: 32.5 grams of acetylsalicylic acid chlorid and 30 gr. trichlorisobutyl alcohol are dissolved in the presence of 25 grams of calcium carbonate in 8 cubic centimeters of benzene, heated a few hours, allowed to cool, put into a further amount of benzene, successively shaken with soda solution and water, whereupon the residue is recrystallized.

The acetyl salicylic acid trichlorisobutyl ester

melts at a temperature of 75 degrees centigrade, has a neutral reaction, can be distilled *in vacuo* at a temperature of 185 degrees centigrade under partial decomposition, crystallizes well, and when treated with alkali splits off the acetyl group. When lightly heated with concentrated sulfuric acid it gives off hydrochloric acid.

The acidylated salicylic acid esters produced as described are of interest by reason of their physiological action. Particularly the trichlorisopropyl and trichlorisobutyl esters are valuable, because they combine the anesthetic and anodyne action of their alcohols with the antirheumatic action of the salicylic acid.

I claim herein as my invention:

1. The herein described process of producing acidylsalicylic acid esters, which consists in causing an alcohol to act on acidylsalicylic acid halogenids and immediately rendering the hydrogen halogenic acid which is formed ineffective.

2. The herein described process of producing acidyl salicyclic acid esters, which consists in causing an alcohol to act on an acidylsalicylic acid chlorid in the presence of a medium which is adapted to bind hydrochloric acid.

3. The herein described process of producing acetyl salicylic acid trichlorisobutyl ester, which consists in heating acetylsalicylic acid chlorid with trichlorisobutyl alcohol and a medium which is adapted to bind hydrochloric acid.

4. The herein described process of producing acetylsalicylic acid trichlorisobutyl ester, which consists in dissolving acetylsalicylic acid chlorid and trichlorisobutyl alcohol in the presence of calcium carbonate in benzene, heating the solution, allowing the same to cool, dissolving the product in benzene, successively shaking with diluted hydrochloric acid, soda solution, and water, and recrystallizing the product.

5. As a new product, the herein described acetyl salicylic acid trichlorisobutyl ester, which crystallizes in needles, melts at a temperature of 75 degrees centigrade, boils under partial decomposition *in vacuo* at a temperature of about 185 degrees centigrade, is readily soluble in the usual organic solvents, insoluble in water, has a neutral reaction, splits off salicylic acid when heated with alkali, and gives off hydrochloric acid when heated with concentrated sulfuric acid.

RICHARD WOLFFENSTEIN.

Witnesses:
ARTHUR MARRUSE,
HENRY HASPER.